United States Patent
Kohnke (10) Patent No.: US 8,402,465 B2
(45) Date of Patent: Mar. 19, 2013

(54) SYSTEM TOOL PLACEMENT IN A MULTIPROCESSOR COMPUTER

(75) Inventor: Marlys Kohnke, Eagan, MN (US)

(73) Assignee: Cray Inc., Seattle, WA (US)

( * ) Notice: Subject to any disclaimer, the term of this patent is extended or adjusted under 35 U.S.C. 154(b) by 453 days.

(21) Appl. No.: 12/692,853

(22) Filed: Jan. 25, 2010

(65) Prior Publication Data

US 2011/0125992 A1    May 26, 2011

Related U.S. Application Data

(60) Provisional application No. 61/264,043, filed on Nov. 24, 2009.

(51) Int. Cl.
*G06F 9/46* (2006.01)
(52) U.S. Cl. ......... 718/102; 718/100; 718/101; 718/104
(58) Field of Classification Search .................. 718/100, 718/101, 102, 104
See application file for complete search history.

(56) References Cited

U.S. PATENT DOCUMENTS

| | | | |
|---|---|---|---|
| 7,917,909 B2* | 3/2011 | Stall | 718/106 |
| 2009/0132998 A1* | 5/2009 | Meijer et al. | 717/124 |
| 2009/0292900 A1* | 11/2009 | Karo | 712/28 |
| 2009/0319999 A1* | 12/2009 | Stall et al. | 717/128 |
| 2010/0107012 A1* | 4/2010 | Gooding | 714/37 |
| 2010/0122261 A1* | 5/2010 | Karo | 718/104 |
| 2011/0191633 A1* | 8/2011 | Archer et al. | 714/32 |
| 2012/0084753 A1* | 4/2012 | Maybee et al. | 717/124 |

OTHER PUBLICATIONS

Karo et al. "The Application Level Placement Scheduler", Cray User Group (CUG), May 8, 2006, pp. 1-7.*

* cited by examiner

*Primary Examiner* — Emerson Puente
*Assistant Examiner* — Willy W Huaracha
(74) *Attorney, Agent, or Firm* — Perkins Coie LLP (57) ABSTRACT

A multiprocessor computer system comprises a plurality of nodes and an application placement module operable to place an application on a selected group of the compute nodes. The application placement module includes a system tool helper operable to manage operation of a system tool on the selected group of the compute nodes, the system tool operable to monitor execution of the application. Managing system tool operation comprises at least one of distributing, executing, and ending the system tool on one or more compute nodes.

12 Claims, 3 Drawing Sheets

SYSTEM TOOL PLACEMENT IN A MULTIPROCESSOR COMPUTER

CROSS-REFERENCE TO RELATED APPLICATIONS

This application claims the benefit of U.S. Provisional Application Ser. No. 61/264,043, filed Nov. 24, 2009, which application is incorporated herein by reference and made a part hereof in its entirety.

FIELD

The invention relates generally to placing system tools in a computer system, and more specifically in one embodiment to placing system tools in a multiprocessing computer environment.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors run software that is operable to assign tasks to other processors or to split up a task so that it can be worked on by multiple processors at the same time. In such systems, the data being worked on is typically stored in memory that is either centralized or is split up among the different processors working on a task.

Instructions from the instruction set of the computer's processor or processors that are chosen to perform a certain task form a software program that can be executed on the computer system. Typically, the software program is first written in a high-level language such as "C" that is easier for a programmer to understand than the processor's instruction set. A program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

The program runs on multiple processors by passing messages between the processors, such as to share the results of calculations, to share data stored in memory, and to configure or report error conditions within the multiprocessor system. In more sophisticated multiprocessor systems, a large number of processors and other resources can be split up or divided to run different programs or even different operating systems, providing what are effectively several different computer systems made up from a single multiprocessor computer system.

Programmers and system operators often use system tools such as debuggers that enable tracking execution of a software program to confirm proper program execution. But, when system tools such as a debugger or checkpoint/restart tool are applied to a program distributed across a large number of nodes, placement and management of the system tools is a concern.

SUMMARY

Some embodiments of the invention include a multiprocessor computer system comprising a plurality of nodes and an application placement module operable to place an application on a selected group of the compute nodes. The application placement module includes a system tool helper operable to manage operation of a system tool on the selected group of the compute nodes, the system tool operable to monitor execution of the application. In a further example, managing system tool operation comprises at least one of distributing, executing, and ending the system tool on one or more compute nodes.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or applications. Other embodiments of the invention exist and are within the scope of the invention, and logical, mechanical, electrical, and other changes may be made without departing from the scope or subject of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

In multiprocessor computer environments in which multiple applications, multiple operating systems, or multiple virtual machines are running, scheduling and managing computing resources well can significantly affect the usefulness and efficiency of the computer system as a whole. Many such systems will be used or configured differently by different customers, such that one customer uses an entire computer system as a single high-powered supercomputer, while another customer allows users to run separate instances of different operating systems, each executing different software on different schedules.

But, debugging or managing software distributed across hundreds or thousands of processing nodes faces many of the same challenges as application placement itself—distributing, managing, and terminating a system tool present a significant task, especially when executed in coordination with a distributed application.

ALPS/BASIL/Reservation Environment

One example environment described below provides a computer system operator the ability to manage such a computer system using an Application Layer Placement Scheduler (ALPS), in conjunction with a batch system interface known as BASIL and a reservation system. ALPS is designed to work with different batch or job systems for different customers and operates at the system service level, between applications and the operating system. The ALPS scheduler sets various resource policies, such as limiting resources available to a specific application, and in further embodiments provides other functions such as load balancing and masking architectural dependencies from the load balancing process.

Figure 1:
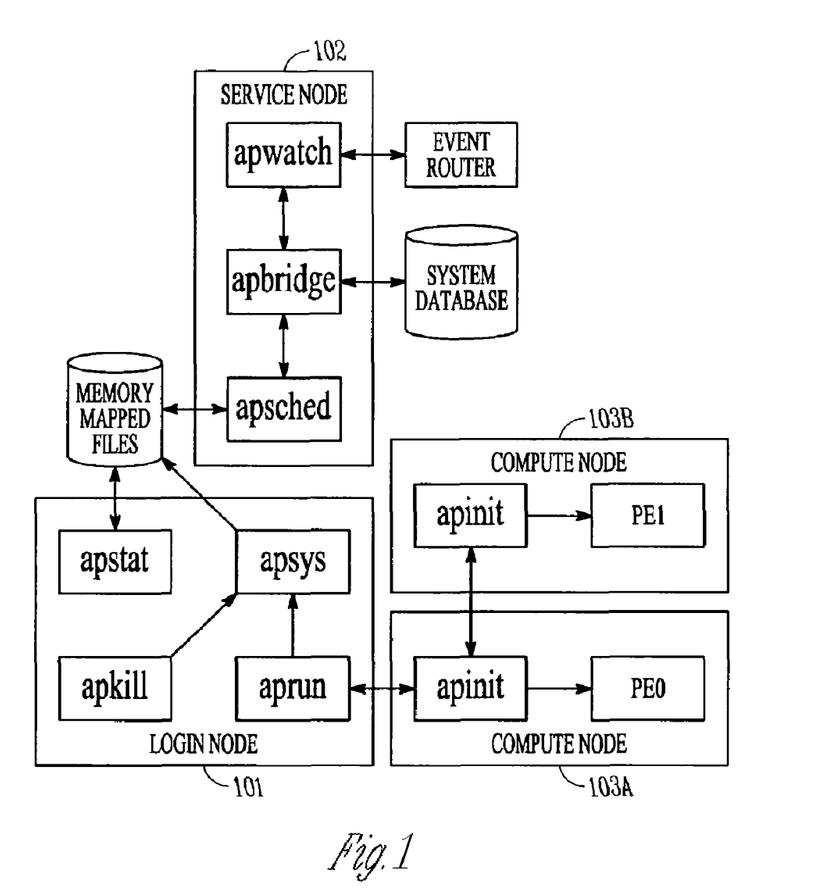
FIG. 1 shows an example application level placement scheduler block diagram, consistent with an example embodiment of the invention.

The ALPS architecture used as an example here is divided into several components, as illustrated in FIG. 1. The modular design presented here facilitates code reuse, such as among different platforms or revisions, and reduces maintenance costs. Here, a login node 101 is coupled via a processor or node interconnect network to a service node 102 and one or more compute nodes 103. In alternate embodiments, the different node processes can execute on the same node, or can each be distributed among multiple nodes.

Referring to the login node 101, the aprun client represents the primary interface between a computer user and an application being executed. Aprun is the login node local representative of the application processes executing on compute nodes. To execute a program, the user specifies various aprun command line arguments that identify the executable application code and convey resource requirements for the application. The aprun client also is responsible for managing application standard input, output, and error streams, and for forwarding user environment information and signals.

The aprun client contacts the apsys daemon also shown as a part of the login node 101. Incoming requests from ALPS client programs are processed in apsys. The apsys daemon forks an agent child process, and the apsys agent process maintains a connection to the apron client. The apsys agent provides access to the application scheduler module apsched in the service node 102.

The apsys daemon further communicates pending application status information to the apstat client in login node 101 via shared memory-mapped files as shown in FIG. 1.

Once aprun has contacted apsys, aprun sends the user-provided resource requirement information regarding application execution to apsys, which forwards the request to the apsched daemon. The apsched daemon tries to find a compute node resource placement to fulfill the user specified resource requirements needed to execute the application. If a suitable resource allocation is not found, this process is repeated until adequate resources are found. When a suitable resource allocation is found, the apsched daemon then generates a placement list, reserves those resources, assigns a unique application identifier (apid), and relays the information to the aprun client through apsys. Once apsched has reserved a set of node resources for an application, apsched ensures the resources cannot be committed to another application.

The apsched daemon shown as part of the service node at 102 of FIG. 1 manages memory and processor resources associated with applications running on various compute nodes. Apsched in further embodiments will attempt to optimize application placement to the extent that it is able to enhance resource utilization and performance. Because different nodes may have different resources available, managing node placement is not a trivial task in many environments. Management of scarce resources such as memory management is also important to ensure efficient operation of the executing applications, and to ensure that memory is not underutilized or oversubscribed.

After receiving a placement list from apsched, the aprun client contacts the apinit daemon running on the first compute node 103A. The apinit daemon forks an application shepherd process to manage the application process or processes that will execute on the processing compute node. The aprun client also transmits the placement list for the application and the executable binary application data to the shepherd process. The variety of process compute nodes assigned to an application form an application control tree of shepherd processes on each node of that assigned set that are operable to communicate with the aprun client, which is then used to initialize the program execution.

The application initialization process begins once the control tree has been established and the placement list communicated to each of the processing nodes' shepherd processes. The user's environment is recreated on each processing node, and other functions such as memory allocation are performed. Control is then passed to the executing application.

During application execution, the shepherd processes on the various nodes propagate application standard input, standard output, and standard error information and handle signal delivery between the executing application processes and the aprun client. The system also ensures that when an application exits, whether normally or due to error, the resources used by the application are surrendered back to the application level placement scheduler. After stray application processes are killed, memory is released, and other such cleanup functions are completed, the aprun client executing on the login node 101 that is managing the specific application exits.

The aprun client therefore represents the primary interface between the user and an executing application. Aprun's primary function is to submit applications to the ALPS system for placement and execution. Aprun parses command line arguments, forwards the user environment to the assigned compute nodes, and manages standard I/O and error streams during program execution.

The apstat client relays status information from the ALPS system to the user, including data describing resource availability, reserved resources, and running applications. In one embodiment, apstat uses memory mapped files that the other daemons maintain to acquire data needed to generate user reports including such data. This reduces the demands on the ALPS daemons during status reporting, enabling them to more effectively service applications.

The apkill client is responsible for delivering signals to applications, normally including a signal type, application ID, and any associated command line arguments. The client contacts the local apsys daemon, which forks a child agent process to manage a transaction. The apsys agent locates the login node on which the aprun client for a target application resides by using the memory mapped files. The apsys agent delivers the signal if the aprun client is on the local node or contacts apsys on the proper node if the application's aprun client is on another node.

The apbasil client represents the interface between ALPS and the batch system, and implements a batch and application scheduler interface layer, or BASIL. BASIL is implemented as a standard protocol, such as an XML protocol interface layer in one embodiment, acting as a bridge between ALPS and third-party batch schedulers or other resource managers.

A variety of daemons execute in the example ALPS environment presented here, including an apbridge, apwatch, apsys, apinit, and apsched daemon. The apbridge daemon provides a bridge between the architecture-independent ALPS system and the architecture-dependent configuration of the underlying multiprocessor computer system. More specifically, it queries a system database to collect data on the hardware configuration and topology, and supplies the data in a standard format to the apsched daemon for scheduling.

The apbridge daemon interfaces with the apwatch daemon, which registers with a machine-specific mechanism to receive system events and forward them in an architecture-neutral format to apbridge for further processing. Apbridge forwards the system state event information to apsched, which uses this information for application placement and resource management decisions.

The apsys daemon provides ALPS client programs privileged access to apsched, and delivers pending application status information to apstat by logging the data to a shared file. There is one apsys daemon per login node, and the apsys daemon forks an apsys agent child to process incoming requests from ALPS client programs. An apsys agent retains a connection to aprun for the life of the aprun program. Other apsuys agent child processes are responsible for processing apkill signal requests, resource reservation messages from apbasil, and notifying apsched about resource reservations to be freed.

The apinit daemon is started on each compute node as part of the boot procedure. The apinit daemon receives connections from an aprun client including information needed to launch and manage a new application. The apinit master daemon constructs a control structure using this information to maintain knowledge regarding the application running on the local node, and forks an apshepherd child process dedicated to managing the specific application on the local node. The apshepherd manages the connection to aprun, while the apinit master daemon continues to listen for new messages and monitors apshepherd processe on the local compute node.

The apshepherd provides standard I/O and error connectivity to the remote aprun client, and initiates the application after performing whatever architecture-specific setup functions are needed to prepare the local node environment for program execution. Apshepherds on the assigned set of compute nodes also receive and forward application launch messages and other such control messages, using various radix specifications as needed to scale to a large number of nodes.

The apsched daemon manages memory and processor resources associated with particular applications running on the various compute nodes in a multiprocessor computer system running ALPS. In some further architectures, non-uniform or shared memory and interconnect state are also managed by the apsched daemon, along with other resources such as nonvolatile storage. Although apsched does not enforce policy, it is responsible for ensuring the accuracy of application placement and resource allocation, such that a resource placement list generated as a result of a reservation placement request includes specific resources that are assuredly reserved for the application.

The apsched daemon is therefore able to mange problems such as preventing memory oversubscription, preventing interactive jobs from taking over resources from temporarily idling batch jobs, and other such problems that are not uncommon in multiprocessor computer systems.

Figure 2:
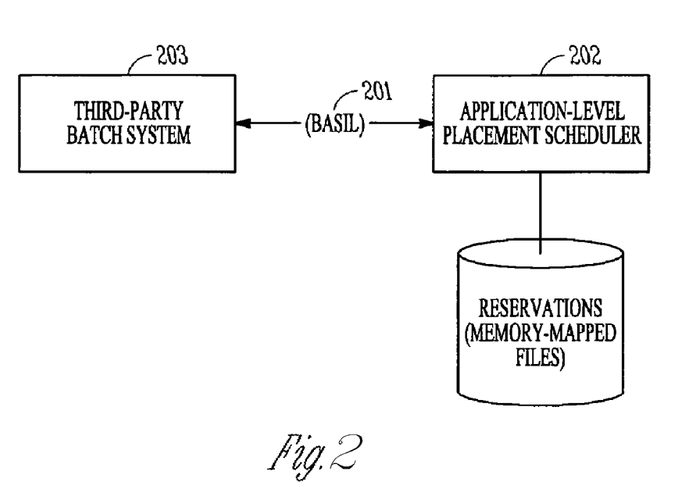
FIG. 2 shows an example multiprocessor system comprising an application level placement scheduler, a batch system, and a reservation system, consistent with an example embodiment of the invention.

The reservation and batch and application scheduler interface layer to third-party batch systems are shown in FIG. 2, and are described in greater detail below. Third-party batch systems can be used in some further examples using a Batch and Application Scheduler Interface Layer 201, or BASIL, to act as a gateway between the Application Level Placement Scheduler 202 and the batch systems 203. BASIL is implemented in one embodiment as an interface protocol that includes the primary functions of inventory, reservation creation, and reservation cancellation. When a user submits a job to a batch system, the batch scheduler determines whether sufficient resources are available to run the job by obtaining a current picture of the available and assigned resources in the computer system. BASIL provides such data through its XML-RPC interface, providing information in a format that can be easily parsed by third-party batch systems.

The batch scheduler can use the XML data obtained from BASIL to schedule one or more batch jobs for execution. Once a batch job has been scheduled, the batch system initalizes the job on one or more login nodes of the multiprocessor computer system, such as node 101 of FIG. 1. During initialization, the batch system creates an ALPS reservation for the job to ensure that compute node resources remain available through the lifetime of the executing application. Although there may be resources that are not utilized during some periods of application execution, the reservation system of ALPS prevents ALPS from creating conflicting resource assignments.

The apbasil client in the ALPS system therefore acts as an interface between various batch systems, including third-party batch systems, and the lower level system resource manager within the example system presented here. During execution of a batch job, there may be several calls to aprun to launch applications using the reserved set of resources. ALPS recognizes that the application launch occurs via the batch scheduler job, and only assigns resources for the application from those resources reserved for the job.

Upon completion of a batch job, the batch system makes a final BASIL request to cancel the reservation for the job. The reserved resources are then freed, and are available for reassignment to other jobs.

BASIL and ALPS therefore operate using a system of reservations, providing support for both batch and interactive application execution in a multiprocessor computer environment. Resource reservation ensures that batch applications are able to reserve the resources needed to schedule and execute the required jobs without interactive applications usurping resources from the batch jobs during periods when the batch application is not actively using all its reserved resources. Reservations also ensure that resources that aren't being used when a batch job is scheduled will still be available when a job executes, rather than simply observing what resources are being utilized and what resources are free at the time the batch job is scheduled.

Apsys is the intial central point of contact for reservation-related messages between the batch systems and apsched. The BASIL interface is used to service reservation traffic from clients, such as batch systems, and placement modules, such as apsched, to eliminate the need for proprietary reservation coding to interact with the reservation system.

The system of application level placement scheduling, batch scheduling, and reservations presented here illustrate how a multiprocessor computer system can manage the availability of resources in the multiprocessor computer system while accommodating third-party batch systems, combinations of interactive and batch jobs, and other challenges. The application level placement scheduler (ALPS) is able to manage availability of resources and to map requests to resources such as processing nodes, and is able to distribute, monitor, and synchronize applications among compute nodes and reclaim compute node resources upon application exit.

The batch and application scheduling interface layer (BASIL) provides an interface between the placement system and batch scheduling systems, including third-party batch scheduling systems, allowing the batch system to perform functions such as requesting compute node resource availability data, and providing for coordination of resource assignments between the batch system and placement scheduler, enabling management of batch jobs containing applications.

The reservation system described allows coordination of resource reservation within the placement scheduler, and between the placement scheduler and the batch system. It also guarantees that resources will be available for applications launched from batch jobs throughout their execution lifetime in environments with interactive applications being launched, and accurately conveys the state and availability of compute nodes and applications.

System Tool Placement

But, placement of system tools in multiprocessor computer systems still typically involves each tool maintaining its own launch, execution, and cleanup mechanisms. These system tools do not scale well to systems having hundreds or thousands of computing nodes per system. A login or control node usually communicates with each other compute node having an instance of the system tool running. The system tool typically must be maintained on each compute node that is executing the program being debugged or managed via the tool. Other problems, including termination of a tool when an application exits abnormally, are also difficult to manage across multiple compute nodes. These problems have required that a system tool itself be able to manage a variety of aspects of execution across a large number of compute nodes, significantly increasing the complexity of creating a useful system tool.

Some embodiments of the invention therefore use system application level placement service such as the ALPS system described above to place and manage system tool operation within a multiprocessor computer system. In a more detailed example, a tool helper interface is provided within the application placement tool, providing placement, execution, and cleanup management of a system tool. The system tool can use knowledge of placement of an application to place copies of itself on processing compute nodes executing the application, using much of the same functionality and information to manage both the application and the system tool. The system tool designer is therefore able to focus on the services provided by the tool rather than managing a distributed program, simplifying tool design and management.

The tool helper provides a variety of services, using various features in the ALPS system, such as aprun and an apid, to manage a system tool. When an application is placed by apsched through a request from the aprun client, an application identifier (apid) is assigned by apsched and returned to aprun. The apid can be used to obtain application specific information, such as the user identity, distribution of the application across various compute nodes, and how many application processes and threads will be executed on each of the assigned compute nodes.

A service is also provided to stage any files the system tool needs to execute on the compute nodes, such as executable code or data files. The tool helper service can be invoked to transfer these files to the appropriate set of compute nodes, as identified by the apid or as determined in other ways. The tool helper service is also operable to execute selected files on the compute nodes, such as to place a group of files and execute a main debugger program identified by the system debugger tool from among the files transferred by the tool helper.

In a more detailed example, the system tool provides the compute node identifier for the first compute node assigned to a specific application, and the assigned apid. The tool helper interface determines the appropriate set of compute nodes to which the system tool files are distributed based on the apid data for the specific application and the identified first compute node.

The system tool executes on a login node and uses the tool helper interface to access the appropriate set of compute nodes. The application control tree already known to ALPS is used to distribute system tool files across the assigned compute nodes executing a specific application, such that the fanout application control tree allows parallel and efficient distribution of files across the nodes. This reduces the burden on the login node, and network congestion near the login node, improving system tool startup times and reducing network congestion.

The tool helper functions within the application level placement system also assume responsibility for monitoring and cleaning up instances of the system tool across the compute nodes. The system tool can be executed using the same set of arguments or parameters across a large number of nodes. After the application being debugged or managed by the system tool exits or crashes, any remaining instances of the system tool will be killed. Files distributed to the compute nodes as part of the system tool are also removed via a cleanup process, ensuring that memory or other storage is freed for other programs to use.

Figure 3:
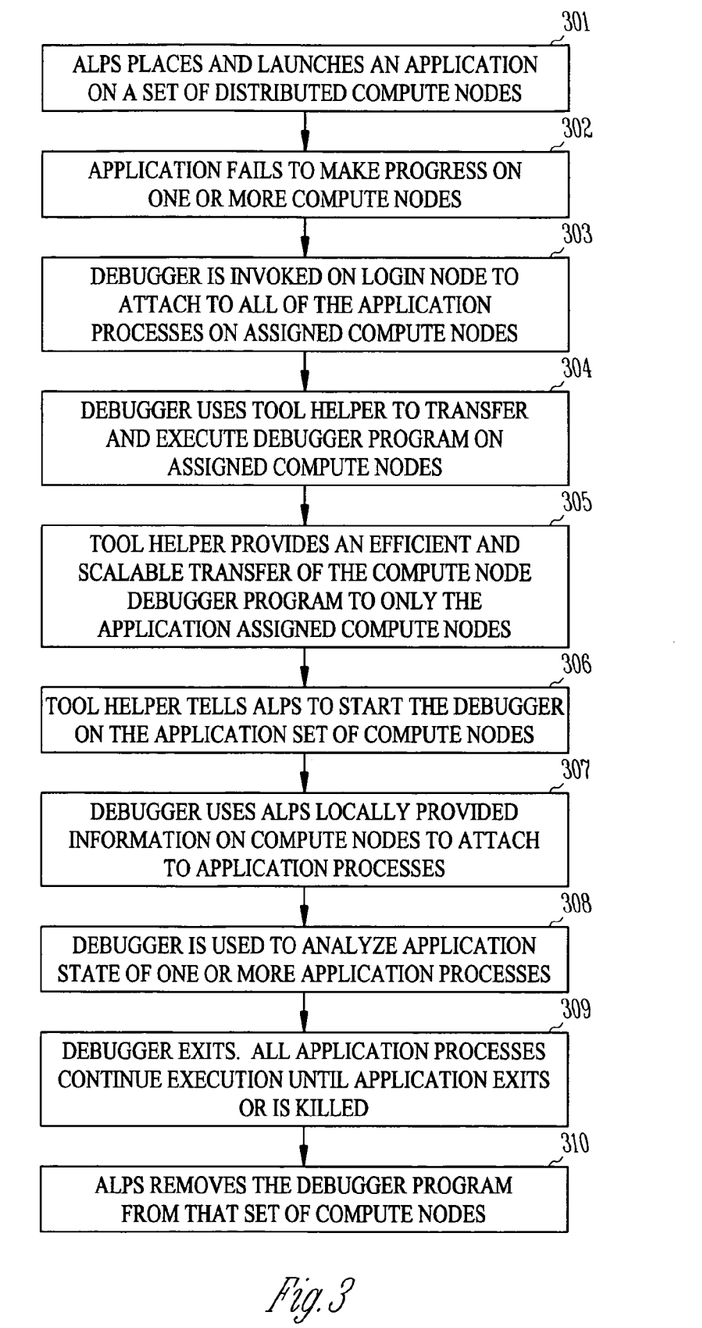
FIG. 3 is a flowchart illustrating operation of an example system tool managed via a system tool helper, consistent with an example embodiment of the invention.

FIG. 3 is a flowchart, illustrating an example method of managing a system tool via an application placement tool helper in a multiprocessor computer environment. At 301, the ALPS application placement system launches an application on a distributed set of compute nodes. The application fails to make progress on one or more nodes as noted at 302, and a debugger tool is invoked on the login node to attach to each of the application processes on the assigned distributed set of compute nodes at 303.

The debugger system tool is invoked by a user. The debugger system tool uses the tool helper feature of the application placement system to transfer and execute the debugger program on each of the application assigned distributed compute nodes at 304. The debugger system tool is therefore distributed to only those compute nodes running a copy of the application being debugged as reflected at 305, and is selectively started on one or more nodes at 306. The debugger may be executed on all nodes running the application being debugged, on only the node that is failing to make progress, or on some other combination of assigned compute nodes.

The debugger system tool uses locally provided ALPS information on the compute nodes on which it is executing to attach to the application processes at 307, and is used to analyze the application state at 308.

Once the debugger has completed the desired debugging functions, the debugger system tool exits at 309. This involves terminating the debugger process on the compute nodes at 309, and removing the debugger program and any related system tool information no longer needed from the compute nodes at 310.

Example system tools include debuggers and checkpoint/restart tools, as well as other such tools. A debugger is typically a computer program that is used to test and debug another program, and includes features such as tracking and showing the state of a computer system and the instructions being executed when an application program crashes. Debuggers often include additional features, such as enabling instruction-by-instruction step-through execution of another program. Checkpoint/restart tools function similarly in that they are programs that are able to stop execution of another program at a checkpoint, examine or alter program and data state information, and restart program execution.

The tool helper allows any system tool involved with a specific application to easily be distributed, executed, and ended only when needed on a specific set of compute nodes in a distributed computing system, improving system tool performance and reducing the complexity of the system tool itself. A system tool running alongside a distributed application can make use of the application id (apid), the application-specific control tree, or other information from an application placement system such as ALPS to improve distribution and management of such system tools. Because many of these details are handled by the application placement system, the tool helper can hide underlying details such as the control tree and application distribution, simplifying end user execution and management of the system tools.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A multiprocessor computer system, comprising:
a plurality of compute nodes; and
an application placement module operable to place an application on a selected group of the compute nodes, the application placement module including a system tool helper;
wherein the system tool helper is operable to manage operation of a system tool on the selected group of the compute nodes, the system tool operable to monitor execution of the application, the system tool helper manages operation of the system tool by:
staging executable code files and data files on the selected group of compute nodes by transferring the executable code files and data files to the selected group of compute nodes;
receiving from the system tool an identification of a transferred executable code file to execute;
executing at each compute node of the selected group of compute nodes an instance of the identified executable code file using the same set of parameters;
detecting that the application has terminated; and
upon detecting that the application has terminated,
killing any remaining instances of the identified executable code file; and
removing the executable code files and the data files that were transferred to the compute nodes.

2. The multiprocessor computer system of claim 1, wherein a system tool helper interface is provided via the application placement module.

3. The multiprocessor computer system of claim 1, wherein the staging comprises transferring files to one or more compute nodes using application placement module's application control tree.

4. The multiprocessor computer system of claim 1, wherein executing comprises executing the executable code file only on those compute nodes that need to run an instance of the system tool.

5. An application placement system, comprising:
a memory storing machine-readable instructions of:
an application placement module operable to place an application on a selected group of a plurality of compute nodes; and
the system tool helper operable to manage operation of a system tool on the selected group of the compute nodes for monitoring execution of the application by:
staging executable code files and data files on the selected group of compute nodes by transferring the executable code files and data files to the selected group of compute nodes;
receiving from the system tool an identification of a transferred executable code file to execute;
executing at each compute node of the selected group of compute nodes an instance of the identified executable code file using the same set of parameters;
detecting that the application has terminated; and
upon detecting that the application has terminated,
killing any remaining instances of the identified executable code file; and
removing the executable code files and the data files that were transferred to the compute nodes; and
a processor.

6. The application placement system of claim 5, the application placement module further comprising a system tool helper interface.

7. The application placement system of claim 5, wherein staging comprises transferring files to one or more compute nodes using application placement module's application control tree.

8. The application placement system of claim 5, wherein executing comprises executing the executable code file only on those compute nodes that need to run an instance of the system tool.

9. A machine-readable memory with instructions stored thereon, the instructions when executed operable to cause a computerized system to:
place an application on a selected group of a plurality of compute nodes via an application placement module, the application placement module including a system tool helper; and
manage operation of a system tool on the selected group of the compute nodes via the system tool helper, the system tool operable to monitor execution of the application, the system tool helper manages operation of the system tool by:
staging executable code files and data files on the selected group of compute nodes by transferring the executable code files and data files to the selected group of compute nodes;
executing at each compute node of the selected group of compute nodes an instance of the identified executable code file;
detecting that the application has terminated; and
upon detecting that the application has terminated,
killing any remaining instances of the identified executable code file; and
removing the executable code files and the data files that were transferred to the compute nodes.

10. The machine-readable memory of claim 9 the application placement module further comprising a system tool helper interface.

11. The machine-readable memory of claim 9, wherein the executable code file and the data files are transferred to one or more compute nodes using application placement module's application control tree.

12. The machine-readable memory of claim 9, wherein executing comprises executing the executable code file only on those compute nodes that need to run an instance of the system tool.

* * * * *

UNITED STATES PATENT AND TRADEMARK OFFICE
CERTIFICATE OF CORRECTION

PATENT NO. : 8,402,465 B2
APPLICATION NO. : 12/692853
DATED : March 19, 2013
INVENTOR(S) : Marlys Kohnke It is certified that error appears in the above-identified patent and that said Letters Patent is hereby corrected as shown below:

In the Specification

In column 5, line 42, delete "processe" and insert -- process --, therefor.

In column 5, line 63, delete "mange" and insert -- manage --, therefor.

In column 6, lines 19-20, delete "initalizes" and insert -- initializes --, therefor.

In column 6, line 55, delete "intial" and insert -- initial --, therefor.

Signed and Sealed this
Second Day of July, 2013

Teresa Stanek Rea
*Acting Director of the United States Patent and Trademark Office*